United States Patent [19]

Reichel et al.

[11] Patent Number: 4,691,349
[45] Date of Patent: Sep. 1, 1987

[54] DUPLEX MICROPHONE COMMUNICATION SYSTEM

[75] Inventors: Kenneth R. Reichel, Hudson; Steve Hebrock, Akron, both of Ohio

[73] Assignee: Audio-Technica U.S., Inc., Stow, Ohio

[21] Appl. No.: 838,587

[22] Filed: Mar. 11, 1986

[51] Int. Cl.$^4$ .............................................. H04B 3/20
[52] U.S. Cl. ...................................... 379/391; 381/122
[58] Field of Search ................. 179/37, 1.1, 121 R; 381/122; 340/313, 825.54; 370/24, 27; 379/391

[56] References Cited

U.S. PATENT DOCUMENTS

| | | | |
|---|---|---|---|
| 3,775,561 | 11/1973 | Guckel | 370/27 |
| 3,862,364 | 1/1975 | Inose et al. | 178/59 |
| 3,983,323 | 9/1976 | Griffith et al. | 178/58 R |
| 4,006,310 | 2/1977 | Bayer | 179/37 |
| 4,598,396 | 7/1986 | Upp et al. | 370/27 |

Primary Examiner—Robert Lev
Attorney, Agent, or Firm—Welsh & Katz, Ltd.

[57] ABSTRACT

A full duplex microphone communications system permitting simultaneous bi-directional communications for a two conductor shielded microphone cable. A talkback signal is injected by an encoder at one end using a balanced input to transmit a common-mode signal on the two conductors of the microphone cable using the shield as a ground reference. This signal is then decoded at the other end of the cable by decoding circuitry which covers the common-mode talkback signal.

13 Claims, 6 Drawing Figures

DUPLEX MICROPHONE COMMUNICATION SYSTEM

This invention relates generally to the field of duplex communications and more particularly to a system to provide full duplex communication on a standard two wire undershield microphone cable.

It is often desirable in the broadcasting and recording industries to have full duplex communication capability between a remote microphone location and the control center. For example, in the typical broadcast environment where a microphone is being used by a reporter to broadcast live from a remote point, the reporter speaks into the microphone and the signal is carried by a two conductor shielded cable to a mixer. The mixer amplifies the signal and sends it to the broadcasting facility by telephone lines or by RF transmission. In this situation, the reporter has no way of knowing when he is "on the air" or if the producer/director wants to give him directions or if the announcer back at the studio wants to ask questions of the reporter. Thus, two-way communications is desirable to permit such return signals as cue signals or instructions or other communications from the control center without the need for additional wiring. There are many other situations in which full duplex communications is desirable but where the extra expense of an additional communications line is prohibitive.

In the prior art, one solution to obtaining full duplex communication utilizes a separate two conductor cable to provide return communications. In another approach, an RF transmitter is used to provide the return signal path. These approaches are, however, both expensive and in the case of RF links, unreliable.

It is accordingly an object of this invention to provide a novel full duplex communication system on a single standard two conductor shielded microphone cable.

It is another object of the invention to provide a full duplex communication system injecting a common-mode signal on a two conductor shielded microphone cable using the shield as a ground reference.

Briefly, according to one embodiment of the invention, a full duplex communication system is provided for simultaneous bi-directional signal transmission between the first and second ends of a two conductor shielded communications channel. The system comprises a encoder at one end for balanced coupling of a desired signal to both conductors of the communications channel at the first end and utilizing the communications channel shield as ground reference, thereby transmitting a common-mode signal to the second end of the communications channel. At the other end of the communications channel is a decoder for decoding the common-mode signal to recover the desired signal and for simultaneously coupling a microphone signal through the two conductors of the communications channel for transmission to the first end.

BRIEF DESCRIPTION OF THE DRAWINGS

The invention, together with further objects and advantages thereof, may be understood by reference to the following description taken in conjunction with the accompanying drawings.

DETAILED DESCRIPTION OF THE PREFERRED EMBODIMENT

Figure 1:
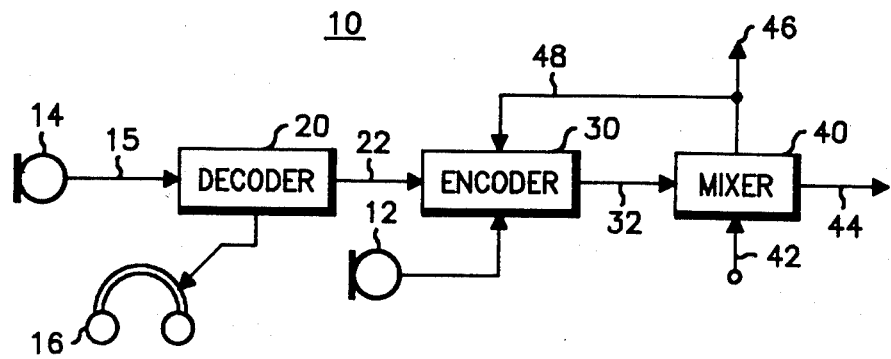
FIG. 1 is a generalized block diagram illustrating a specific embodiment of a duplex microphone communications system according to the invention.

FIG. 1 is a generalized block diagram illustrating the novel duplex microphone communications system 10 providing simultaneous bi-directional communications on a single two conductor shielded microphone cable 22. The system is capable of allowing transmission of a talkback signal of any origin, such as from an auxiliary microphone 12, to a first end of a conventional shielded two conductor microphone cable while the microphone 14 at the first end is simultaneously transmitting its own signal in the opposite direction. Signal separation in excess of 77 dB is obtainable.

In operation, the microphone 14 is used by an operator (e.g. announcer) to generate a signal which is coupled via a microphone cable 15 to a decoder 20 which couples the signal to the conventional two conductor shielded microphone cable 22 for transmission. The decoder 20 may also be located in the housing of the microphone 14 eliminating the need for the cable 15. The signal from the microphone 14 is transmitted over the cable 22 to an encoder 30 located at a receiving end which couples the signal via a cable 32 to a conventional mixer 40 located, for example at a mobile broadcast studio, announce booth or main studio. The encoder 30 may also be incorporated within the mixer 40 eliminating the need for the cable 32.

Normally, no communications with the announcer at the microphone 14 would be possible over the cable 22 while it is being used to transmit signals from the microphone 14. However, with the duplex communications system 10, a talkback signal from the microphone 12 (i.e. the talkback microphone), or simply a cue signal, may be applied to the encoder 30 which injects this signal as a common-mode signal on the cable 22 via a balanced input, thereby transmitting the signal to the decoder 20. The decoder 20 detects (i.e. decodes) the common-mode signal and couples an amplified signal to a pair of auxiliary earphones or ear pieces 16 which are normally worn by the announcer using the microphone 14. This permits communication with the announcer while he is using the microphone 14 without requiring an additional expensive communication line. Thus, for example, a director using the microphone 12 can send instructions over the cable 22, or an announcer at the broadcast studio (not shown) using another microphone with input 42 to the mixer 40 could communicate with the announcer at the other end of the cable 22. The output 44 of the mixer 40 is the coonventional output which is broadcast, recorded, put on video tape, film, etc. In addition, typically another input 46 of mixer 40 can be coupled to additional headphones (not shown) to permit the studio announcer, director, etc. to monitor the transmitted signals. A portion of this signal can be coupled, as shown, to the encoder 30 via a conductor 48.

The system of FIG. 1 thus permits an inexpensive means for simultaneous bi-directional communications on a single shielded microphone cable having two conductors. This system may be used in numerous applications. For example, two way communications with a remotely located announcer in broadcast settings or simplified wiring of simultaneous translation systems in which the dialogue to be translated can be transmitted to the translator on the same microphone cable that is used for the translated material. Other examples include simplified teleconferencing system where incoming signals can be transmitted to participants without the need for extra wires, or theater communications systems in which stage cues and intercom information can be sent from a console via the same cable that is used for the microphone, thereby eliminating the need for extra lines. In addition, the communications system 10 is easily incorporated into an existing system by the addition of an encoder 30 and a decoder 20 configured as shown in FIG. 1.

Figure 2:
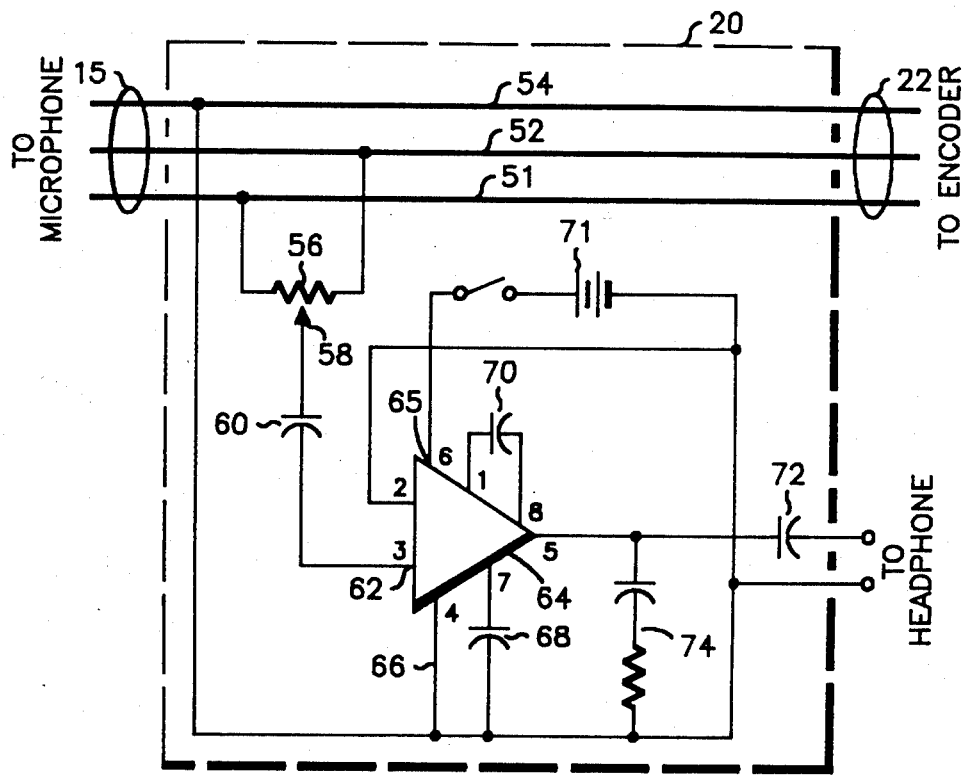
FIG. 2 is a detailed schematic diagram illustrating a specific embodiment of the decoder circuit shown in FIG. 1 according to the invention.

Referring now to FIG. 2, there is shown a detailed schematic diagram of the decoder 20 according to the invention. The microphone cables 15, 22 comprise two conductors 51, 52 and a conductive shield 54, as shown. The signal from the microphone 14 is coupled across the conductors 51, 52 in the conventional manner and is transmitted down the cable to the mixer 40 (see FIG. 1). In the decoder 20, a potentiometer 56 is coupled across the conductors 51, 52, as shown with the wiper 58 coupled through a coupling capacitor 60 to an input 62 of a high gain amplifier circuit 64 (e.g. an LM 386 or an OM 200/62 hearing aid amplifier manufactured by Signetics). The amplifier 64 includes capacitors 70, and 68, and ground connection 66, configured as shown. Ground reference is provided by connection to the shield 54 and power is provided by a battery 71 coupled to the voltage source input 65 of the amplifier 64, as shown. The output of the amplifier 64 is coupled to the auxiliary headphone 16 shown in FIG. 1 through a coupling capacitor 62 with an output resistor-capacitor network 74 providing filtering. Thus, the decoder circuit 20 detects and amplifies the common-mode talkback signal applied to the cable lines, 52, 51, using the shield 54 as ground reference, and then applies the detected signal to the earphones 16. The embodiment of FIG. 2 is one of many circuit configurations which may be constructed to decode the common-mode signal on the cable 22.

Figure 4:
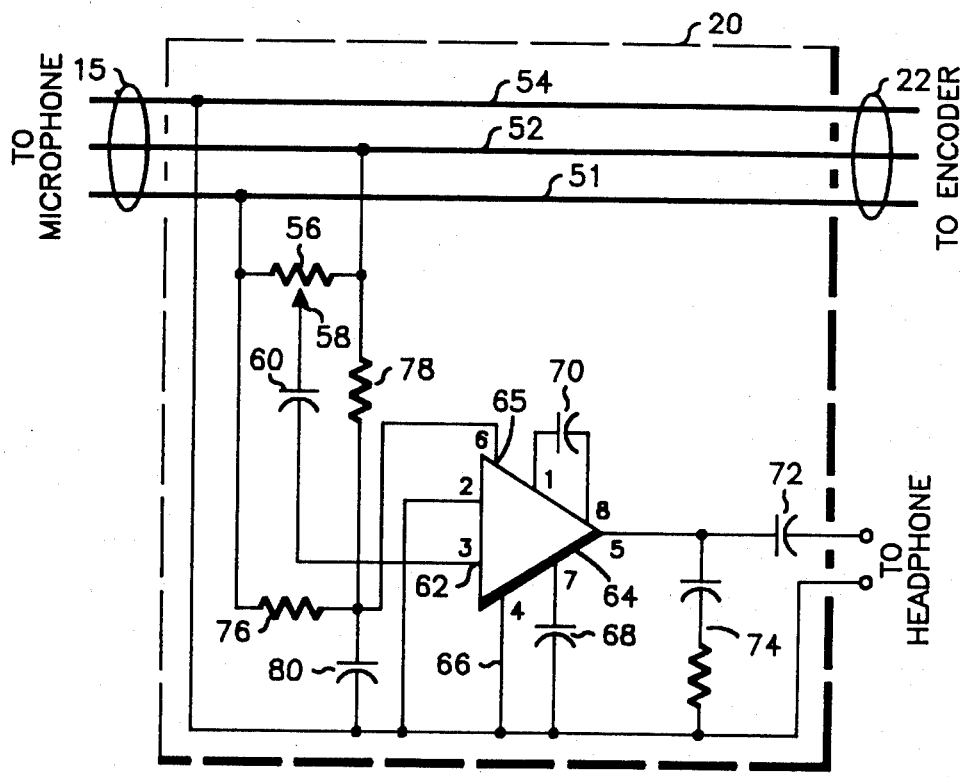
FIG. 4 is a detailed schematic diagram illustrating another specific embodiment of the decoder circuit shown in FIG. 1 according to the invention.

A detailed schematic diagram illustrating an alternative configuration is shown in FIG. 4. This configuration is similar to the embodiment of FIG. 2 except that no battery is required. This configuration is used when a common-mode DC voltage (phantom power) is applied to the cable at the mixer end using the shield as ground reference in addition to the talkback signal. The primary difference from FIG. 2 is that the DC voltage on the cable is coupled from the conductors 51, 52 through the resistors 76, 78 then filtered by a by-pass capacitor 80 and applied to the voltage source input 65 of the amplifier 64. Thus, in effect the common-mode DC voltage is modulated while still allowing the DC voltage applied in a common-mode form to power a microphone requiring phantom power.

Figure 3:
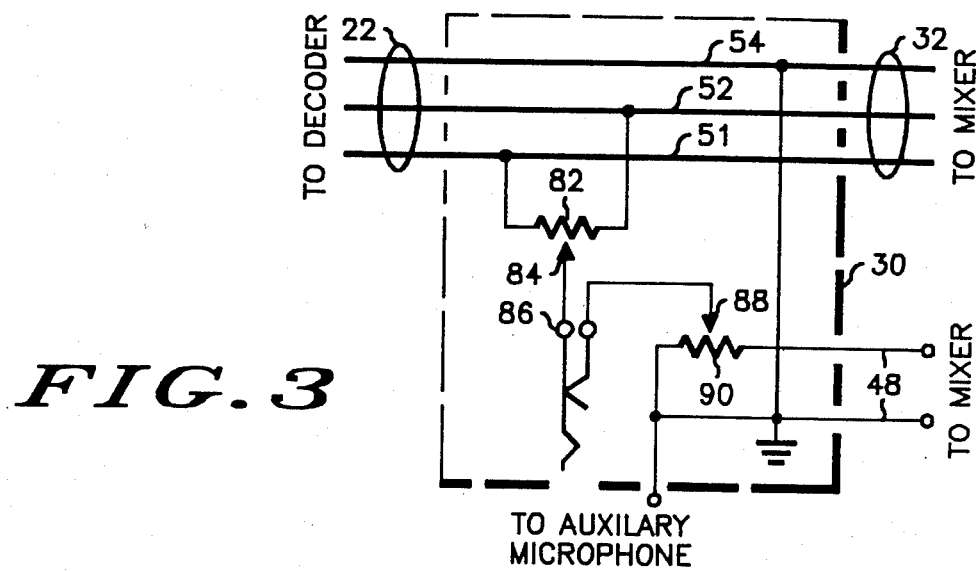
FIG. 3 is a detailed schematic diagram illustrating a specific embodiment of the encoder circuit shown in FIG. 1 according to the invention.

Referring now to FIG. 3, there is shown a detailed schematic diagram of the encoder 30 according to the invention. As in FIG. 2, the microphone cable 22 comprises two conductors 51, 52 and a conductive shield 54. The main signal from the microphone 14 on the conductors 51 and 52 is passed through the encoder 30 directly to the mixer 40 (see FIG. 1) as in a conventional system. The encoder 30 taps into the cable 22, coupling a potentiometer 82 across the conductors 51 and 52 (alternatively a center tapped transformer may be used) with the wiper 84 connected, as shown, to an input jack 86 for a low impedance microphone. This input jack 86 is configured so that the auxiliary microphone 12 (i.e. the talkback microphone) is coupled to the wiper 84 when the microphone 12 is plugged into the jack 86, and so that the wiper 88 of the potentiometer 90 is connected when the microphone is not plugged into the jack 86. The potentiometer 90 is coupled to the mixer headphone output 46 via the conductors 48 (see FIG. 1). As a result, when a microphone is plugged in, private communications (not interfering with normal transmission from reference numeral 14 to reference number 40) can be injected by a common-mode method onto the cable 10 and transmitted to the announcer at the microphone 14. This signal is injected in common-mode (i.e. in phase) equally on both conductors 51, 52. This balanced input is applied by adjusting the balance with the potentiometer 82 until a minimum signal (i.e. null) is obtained at the mixer or by use of a high quality center tapped transformer. As a result, the signal separation obtainable if both signals are at about the same level is approximately equal to the common-mode rejection of the mixer input stage. When the microphone is not plugged in, the announcers on each end (i.e. at microphone 14 and for example, at the studio annnouncer microphone which may be connected to input 42) can communicate with each other, with the potentiometer 88 used to adjust the level of headphone feed from the mixer 40 on line 48. The shield conductor 54 provides the ground reference. The embodiment of FIG. 3 is only one of many circuit configurations which may be constructed to inject the talkback signal onto the communications channel.

Figure 5:
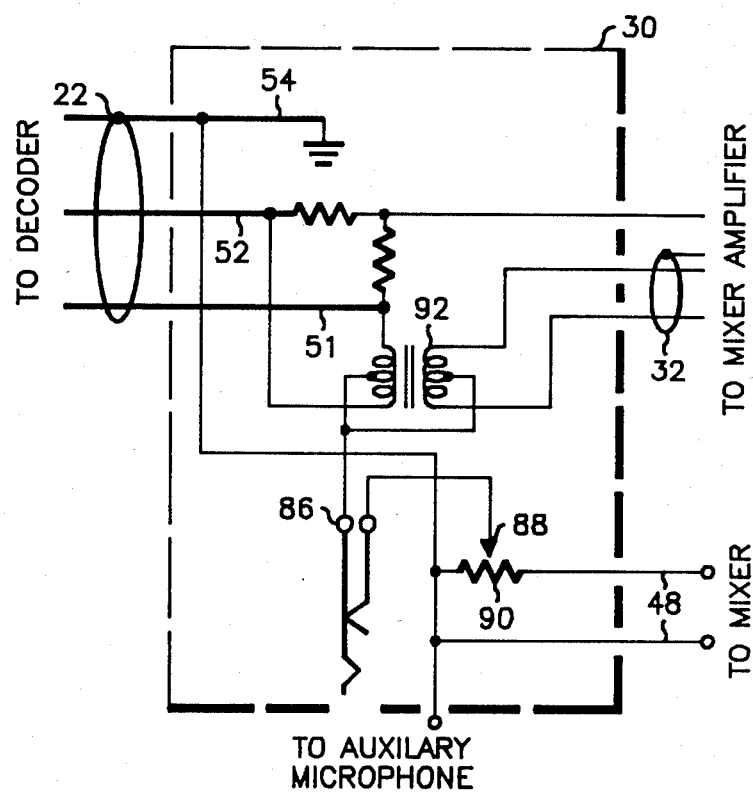
FIG. 5 is a detailed schematic diagram illustrating another specific embodiment of the encoder circuit shown in FIG. 1 according to the invention.

A detailed schematic diagram illustrating an alternative configuration is shown in FIG. 5. This embodiment functions largely as in the embodiment of FIG. 3 but utilizes a center tapped transformer 92 to provide the balanced injection of the talkback signal from the input jack 86 and to couple the main microphone signal to the mixer. In addition, a DC voltage (e.g. 9–50 volts) to power devices at the other end of the cable is coupled to the conductors 51, 52 from the mixer 40 with the shield 54 functioning as the ground reference. Effectively, this embodiment applies a common-mode modulated DC voltage on the cable. This configuration is particularly suitable for use with the decoder of FIG. 4 which utilzies a DC voltage on the cable 22.

Figure 6:
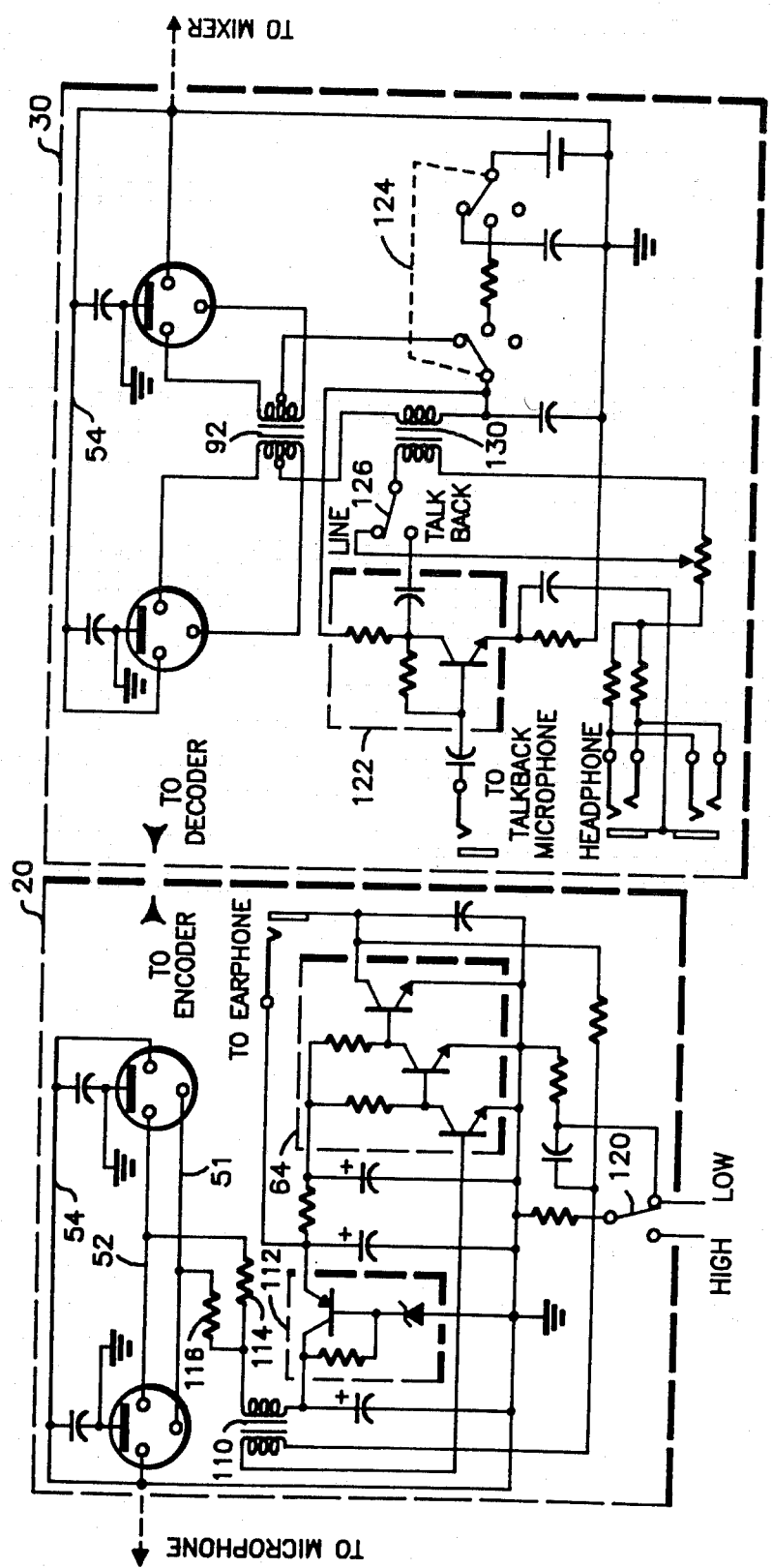
FIG. 6 is a detailed schematic diagram illustrating another specific embodiment of the encoder and the decoder circuit shown in FIG. 1 according to the invention.

Referring to FIG. 6, another alternative embodiment of the encoder 20 and decoder 30 of FIG. 1 is illustrated in a detailed schematic diagram. This embodiment of the decoder 20 is structured and functions largely as in the embodiment of FIG. 4, except that a transformer 110 is used to couple the signal from the microphone lines 51, 52 to the amplifier 64 thereby replacing the coupling capacitor 60 of FIG. 4. The amplifier 64 is comprised of a three transistor high gain amplifier as shown, and a conventional protection circuit 112 is provided to limit the supply voltage to 9 v. In addition, the potentiometer 56 of FIG. 4 is replaced with the two resistors 114 and 116, as shown and a gain switch 120 is provided to permit selection of a high or low gain to accomodate a variety earphones or ear pieces.

The encoder 30 of FIG. 6 is similar in structure and function to the embodiment of FIG. 5 using a center tapped transformer 92. An added amplifier 122, as shown, provides isolation and amplification of the talkback microphone signal and selection switches 124 permit selection of internal battery power or phantom power. In addition, a selection switch 126 permits selection of a talkback or line monitoring mode with the talkback signal coupled through a transformer 130.

A specific embodiment of the novel duplex microphone communication system has been described for the purposes of illustrating the manner in which the invention may be made and used. It should be understood that implementation of other variations and modifications of the invention in its various aspects would be apparent to those skilled in the art, and that the invention is not limited by the specific embodiments described. It is therefore contemplated to cover by the present invention any and all modifications, variations, or equivalents that fall within the true spirit and scope of the basic underlined principals disclosed and claimed herein.

What is claimed is:

1. A full duplex communications system for providing simultaneous bi-directional signal transmission between first and second ends of a two center conductor shielded communications channel, comprising:
   encoder means for balanced coupling of a talkback signal to both center conductors of the communications channel at the first end thereof utilizing the communications channel shield as ground reference, thereby transmitting a common-mode signal to the second end of the communications channel;
   decoder means, coupled to the second end of the communications channel, for decoding the common-mode signal to recover the talkback signal and for simultaneously coupling a differential microphone signal across the two center conductors of the communications channel for transmission to the first end thereof.

2. The system of claim 1 wherein the decoder means comprises a self-contained power source.

3. The system of claim 1 wherein the talkback signal of the encoder means is a modulated DC voltage and the decoder means further comprises means for deriving power from the modulated DC voltage.

4. The system of claim 1 wherein the encoder means further comprises means for adjusting the balance of the coupling of the talkback signal to communications channel center conductors.

5. The system of claim 1 wherein the decoder means further comprises means for converting the recovered talkback signal to an audible signal.

6. The system of claim 1 wherein the decoder means further comprises a high gain amplifier.

7. The system of claim 1 wherein the encoder means further comprises an auxiliary microphone for supplying the talkback signal.

8. The system of claim 1 wherein the encoder means comprises a center tapped transformer to couple the talkback signal to the communications channel.

9. The system of claim 8 wherein the encoder means comprises means for coupling a DC voltage to the two conductors of the communications channel utilizing the shield of the communications channel as ground reference.

10. A method of providing simultaneous bi-directional signal transmission on a two center conductor shielded communications channel, comprising the steps of:
    coupling a desired differential signal across the two center conductors of the communications channel at a first end for transmission to the second end;
    coupling a talkback signal equally to the two center conductors of the communications channel in common-mode at the second end for transmission to the first end utilizing the shield as ground reference.

11. The method of claim 10 further comprising the step of coupling a DC voltage in common-mode to the two center conductors of the communication channel at the second end utilizing the shield of the communications channel as a ground reference.

12. The method of claim 11 further comprising the step of extracting the DC voltage at the first end of the communication channel and utilizing the DC voltage as a supply voltage.

13. The method of claim 10 further comprising adjusting coupling of the talkback signal to the two center conductors to obtain a balanced input of the talkback signal.

* * * * *